US008640423B2

(12) United States Patent
Meppelink et al.

(10) Patent No.: US 8,640,423 B2
(45) Date of Patent: Feb. 4, 2014

(54) APPARATUS AND METHOD FOR MOUNTING A RENEWABLE ENERGY PANEL ON A ROOF

(75) Inventors: Joseph Meppelink, Houston, TX (US); Andrew Vrana, Houston, TX (US); Chris Boyer, Grand Prairie, TX (US)

(73) Assignees: The University of Houston System, Houston, TX (US); Metalab LLC, Houston, TX (US); Standard Renewable Energy Inc., Houston, TX (US)

( * ) Notice: Subject to any disclaimer, the term of this patent is extended or adjusted under 35 U.S.C. 154(b) by 0 days.

(21) Appl. No.: 12/874,875

(22) Filed: Sep. 2, 2010

(65) Prior Publication Data

US 2011/0056536 A1 Mar. 10, 2011

Related U.S. Application Data

(60) Provisional application No. 61/239,956, filed on Sep. 4, 2009.

(51) Int. Cl.
*E04D 5/00* (2006.01)

(52) U.S. Cl.
USPC .......... 52/747.1; 52/173.3; 248/910; 126/704

(58) Field of Classification Search
USPC ............... 52/173.1, 173.3, 204.1, 200, 747.1; 126/571, 704, 696; 248/346.2, 129, 248/910
See application file for complete search history.

(56) References Cited

U.S. PATENT DOCUMENTS

| 4,378,006 | A  | * | 3/1983  | Hawley ........................ 126/569 |
| 5,746,839 | A  | * | 5/1998  | Dinwoodie .................. 136/251 |
| 5,875,578 | A  | * | 3/1999  | Grewe .......................... 40/608 |
| 6,105,316 | A  | * | 8/2000  | Bottger et al. ............... 52/173.3 |
| 7,584,563 | B2 | * | 9/2009  | Hillstrom et al. .......... 40/607.01 |
| 7,921,843 | B1 | * | 4/2011  | Rawlings ..................... 126/623 |
| 2003/0145498 | A1 | * | 8/2003  | Venegas, Jr. ................ 40/607.1 |
| 2004/0128923 | A1 |   | 7/2004  | Moulder et al. |
| 2008/0029144 | A1 |   | 2/2008  | Brazier et al. |
| 2008/0087275 | A1 | * | 4/2008  | Sade et al. ..................... 126/623 |
| 2008/0230047 | A1 | * | 9/2008  | Shugar et al. ................. 126/569 |
| 2009/0320266 | A1 | * | 12/2009 | Hillstrom et al. ............... 29/428 |
| 2010/0038516 | A1 | * | 2/2010  | Trueb ........................... 248/544 |
| 2010/0212714 | A1 | * | 8/2010  | Rothschild et al. ........... 136/244 |

FOREIGN PATENT DOCUMENTS

DE 20301389 * 3/2004 ............. E04D 13/18

* cited by examiner

*Primary Examiner* — William Gilbert
*Assistant Examiner* — Beth Stephan
(74) *Attorney, Agent, or Firm* — Jackson Walker L.L.P.

(57) ABSTRACT

An apparatus for retaining a photovoltaic panel on a rooftop includes a vessel having a first side, second side, front, bottom, and top panels, wherein the panels are attached to define a void within the vessel. A fill port is disposed on the vessel. A first hole is adapted to receive a screw on the top panel, wherein the first hole is aligned with a second hole disposed on the bottom panel, wherein the first and second holes are adapted to be aligned with a third hole on a first mounting cross arm. The top panel is inclined at an angle relative to the bottom panel.

13 Claims, 7 Drawing Sheets

APPARATUS AND METHOD FOR MOUNTING A RENEWABLE ENERGY PANEL ON A ROOF

CROSS-REFERENCE TO RELATED APPLICATIONS

This application claims priority to provisional application No. 61/239,956 filed Sep. 4, 2009 entitled, "PV POD."

FIELD OF THE INVENTION

The present disclosure relates generally to assemblies and fabrication methods for attaching a panel to a rooftop. Specifically the present disclosure relates to an apparatus and method for attaching a ballasted, tilt-up racking system to a roof and mounting a renewable energy panel thereon.

BACKGROUND

Advances in photovoltaic cells and other solar power generation devices, collectively termed "renewable energy panels" have made solar power installations more cost-efficient and increasingly popular as a form of green energy generation. Renewable energy panels include, but are not limited to, glass-framed silicon photovoltaic panels, thin film and/or laminated panels, and solar thermal panels. Typically, renewable energy panels are flat, most often rectangular modules. These modules are typically placed into renewable energy panel attachment systems such as aluminum frames.

Existing renewable energy panel attachment systems may not be optimal for certain applications. For instance, existing renewable energy panel attachment systems often require labor intensive methods of placement and/or attachment to roof structures. In addition, existing attachment systems often include metal framing parts and roof attachment devices that may damage roof structures. Existing panel attachment systems may be difficult to position because of existing roof structures, such as vents, AC units, curbs or conduits, and often do not provide desired installation flexibility as they typically are sold in standard sizes such as racks that must be installed contiguously in rows across the roof that may not optimize the available installation area. Further, existing attachment systems may be difficult to use because they require high labor costs to move necessary materials to a roof top, expensive training in installation procedures or specialized tools and equipment for installation. Moreover certain existing attachment systems, such as those involving concrete blocks may be dangerous because of the risk they present to the laborers and/or the owner of a roof structure, as well as to the roof structure itself due to damage to the roof membrane. Further, the use of concrete blocks or the foot traffic needed to install existing roof structures may be detrimental because such use may void manufacturer's warranties on the underlying roof structure. There is a need for a lightweight panel attachment system that can be arranged in varying configurations and that offers safe and speedy installation where direct connection to the roof is not required.

SUMMARY

These and other objects and advantages of the invention, as well as the details of an illustrative embodiment, will be more fully understood from the following specification and figures.

One embodiment of the present disclosure is directed to a renewable energy panel system that includes a renewable energy panel with a frame and a first substantially hollow vessel that has a bottom panel and a top panel. The renewable energy panel is mounted directly to the substantially hollow vessel and the top panel is inclined at an angle relative to the bottom panel.

In another embodiment of the present disclosure, a method of retaining an alternative energy source on a rooftop is described which includes providing a first substantially hollow vessel with a bottom panel and a top panel. The top panel is inclined at an angle relative to the bottom panel. The first substantially hollow vessel has a fill port. The method further includes transporting the substantially hollow vessel to a roof top and conveying a pre-determined quantity of liquid into the substantially hollow vessel. The method further includes mounting a renewable energy panel to the first substantially hollow vessel.

BRIEF DESCRIPTION OF THE DRAWINGS

FIG. 2 is an exploded isometric view of the attachment apparatus of FIG. 1 showing a photovoltaic panel and an embodiment of a vessel of the present disclosure coupled to a set of mounting cross arms;

DETAILED DESCRIPTION OF THE DRAWINGS

Figure 1:
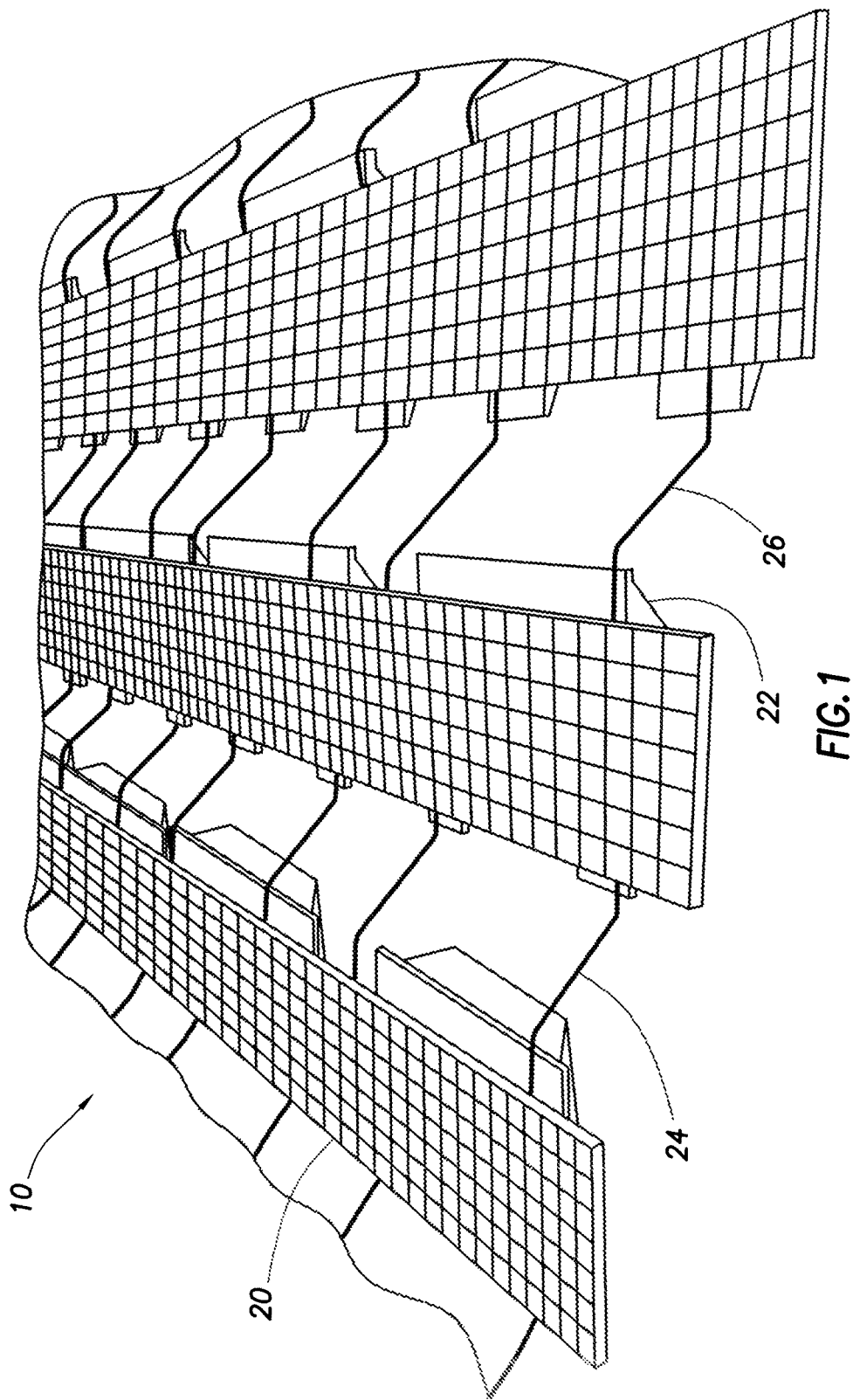
FIG. 1 is a pictorial view of a photovoltaic panel array incorporating one embodiment of the attachment apparatus of the present disclosure.
Figure 1A:
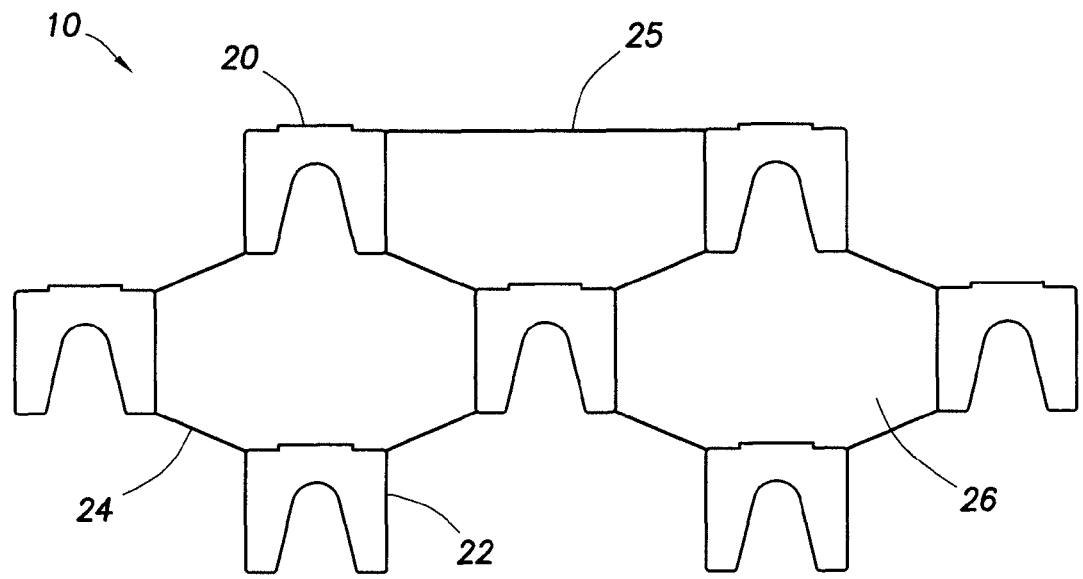
FIG. 1A is plan view of a photovoltaic panel array incorporation another embodiment of the attachment apparatus of the present disclosure.
Figure 8:
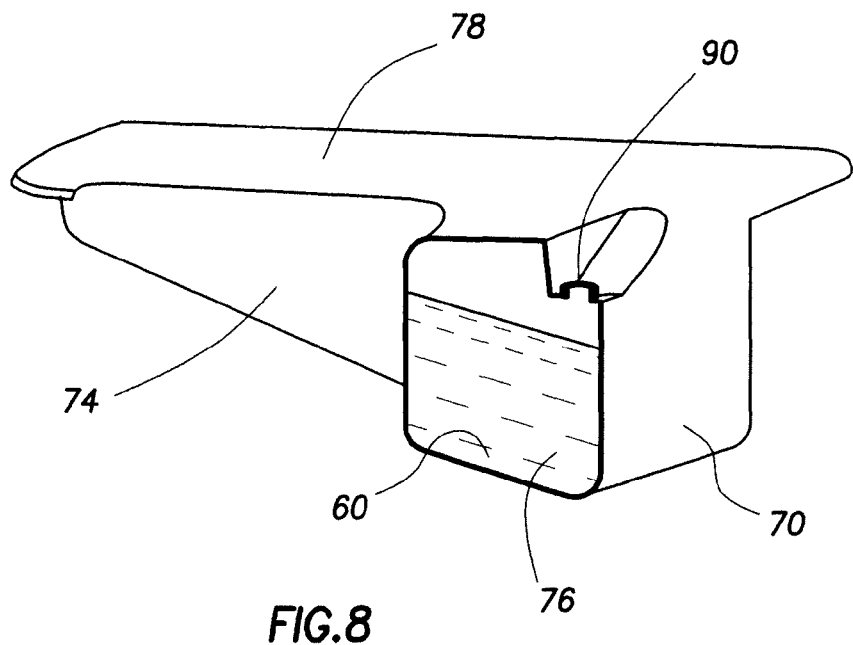
FIG. 8 is a partial sectional view along the sectional lines 8-8 of FIG. 3.

The present disclosure is directed to a system for mounting a renewable energy panel. FIG. 1 depicts a typical renewable energy panel 10 including photovoltaic panels 20 that are attached to vessels 22. While renewable energy panel 10 is shown in use with photovoltaic panels, renewable energy panel 10 may also include thin film and/or laminated panels, and solar thermal panels. Vessels 22 are depicted in FIG. 1 as horseshoe-shaped. This shape of vessels is non-limiting and vessels 22 may be of any appropriate hollow or generally hollow three-dimensional shape that allows mounting of a renewable energy panel or panels and is capable of being filled with ballast as described below, such as, for instance, a wedge or rectangle. FIG. 1A depicts an alternative embodiment of a typical renewable energy panel 10 including photovoltaic panels 20 that are attached to vessels 22.

Vessels 22 may be configured so as to be attachable to other vessels 22 or as standalone vessels. For instance, vessels 22 are shown in FIG. 1 as attached to adjacent vessels 22 by mounting cross arms 24. Mounting cross arms 24 are typically composed of a light weight metal such as aluminum, although any material suitable for this application may be used. This configuration is non-limiting and any suitable method of attachment may be used. Similarly, vessels 22 as shown in FIG. 1 are shown as attached to adjacent vessels 22 by mounting cross arms 24. In the embodiment depicted in FIG. 1A, mounting cross arms 24 are affixed such that one end of mounting cross arm 24 is attached to a vessel 22 at or near the bottom of vessel 22 and the other end of mounting cross arm 24 is attached to an adjacent vessel 22 at or near the top of the adjacent vessel 22. For vessels 22 near the edge of roof 26, it may be necessary to provide additional cross arms 22 to span adjacent vessels 22, as depicted in FIG. 1A by alternative mounting cross arm 25, which is shown as attaching at or near the top of vessels 22 that are near the edge of roof 26.

Vessel 22 is typically configured to accommodate one renewable energy panel per vessel, but may also be configured to allow the mounting of multiple panels per vessel. Further, when vessel 22 is configured to allow it to be attachable to other vessels 22, it is possible to use multiple vessels 22 to accommodate a single renewable energy panel 10. The renewable energy panel 10 as show in FIG. 1 is installed on a rooftop 26; however vessels 22 are suitable for installation wherever desired, including, but not limited to ground installation.

Figure 2A:
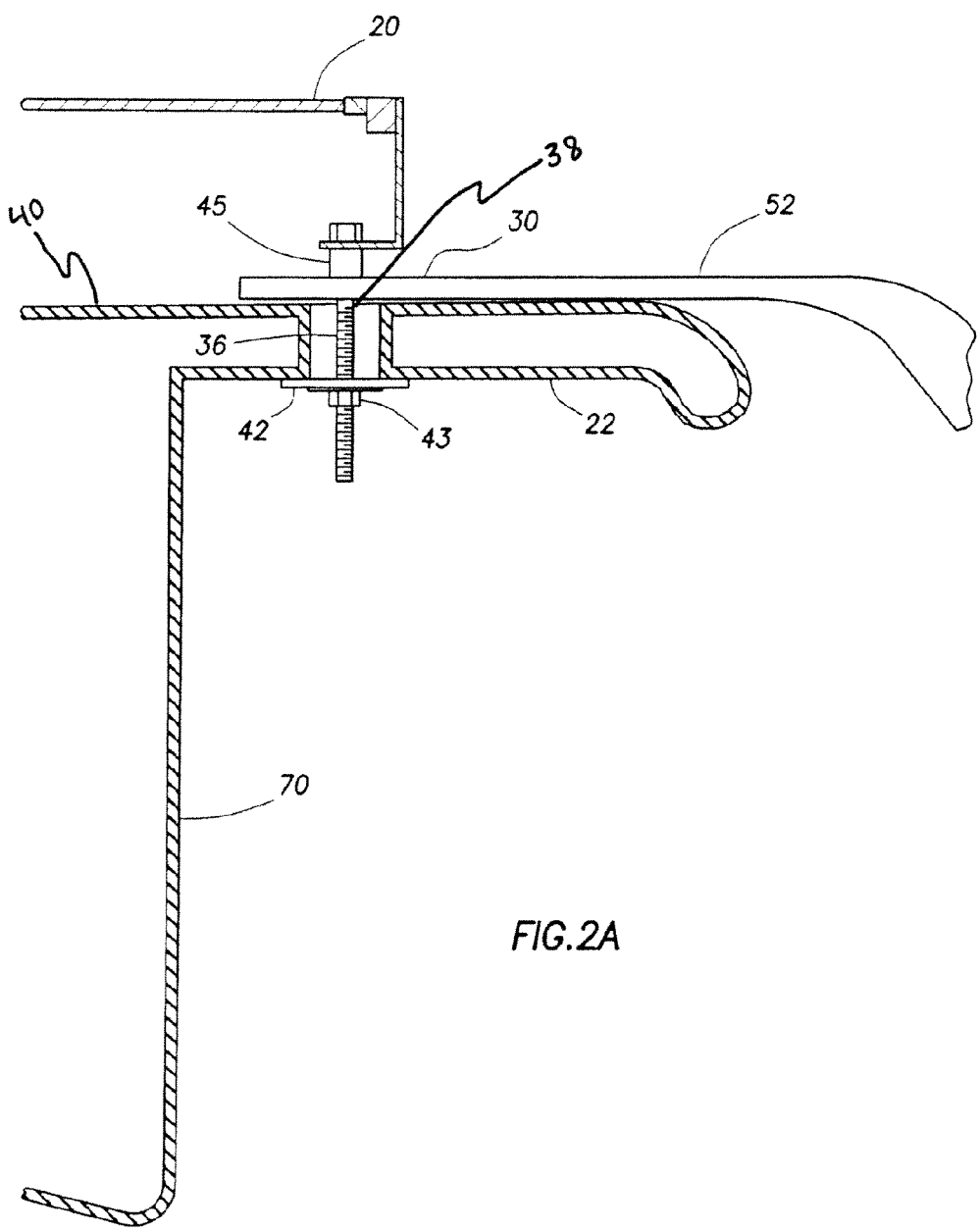
FIG. 2A illustrates a detail view of the attachment of the photovoltaic panel of FIG. 2 to an embodiment of a vessel of the present disclosure.

Renewable energy panel 20 may be affixed to vessel 22 by any number of methods known to those of skill in the art with the benefit of this disclosure, including adhesives, rivets, screws and other mechanical devices. In one non-limiting embodiment, as shown in FIG. 2, renewable energy panel 20 is attached to vessel 22 by clip 30 which includes screws 36 that extend downwardly from the renewable energy panel 20 and are adapted to extend through panel mounting holes 38 on a top side 40 of the vessel 22 (FIG. 2A). Washers 42 are disposed between renewable energy panel 20 and top side 40. Nut 43 is screwed onto washer 42 to secure renewable energy panel 20 to vessel 22. In some embodiments, nylon spacer 45 or aluminum rail 47 may be disposed between the panel 20 and the vessel 22.

Panel mounting holes 38 may be disposed on the top side 40 of vessel 22 in various configurations. In certain embodiments, panel mounting holes 38 may be disposed so as to accommodate the configuration of a variety of different manufacturer's renewable energy panels 20. In the embodiment shown in FIG. 2A, four panel mounting holes are depicted. In certain embodiments of the present invention, renewable energy panel 20 may be affixed to vessel 22 with the use of common hand tools.

In the non-limiting embodiment of the present disclosure depicted in FIG. 2, mounting cross arms 24 have a first flange 44 that extends horizontally from a lower end 46 of an inclined section 48. Second flange 50 extends horizontally from upper end 52 of the inclined section 48. Openings 54 are provided on free ends of first and second flanges 44, 50 to receive the screws 36. Mounting cross arms 24 may be also be affixed to vessels 22 through such means as adhesives, rivets, screws and other mechanical devices.

Figure 2B:
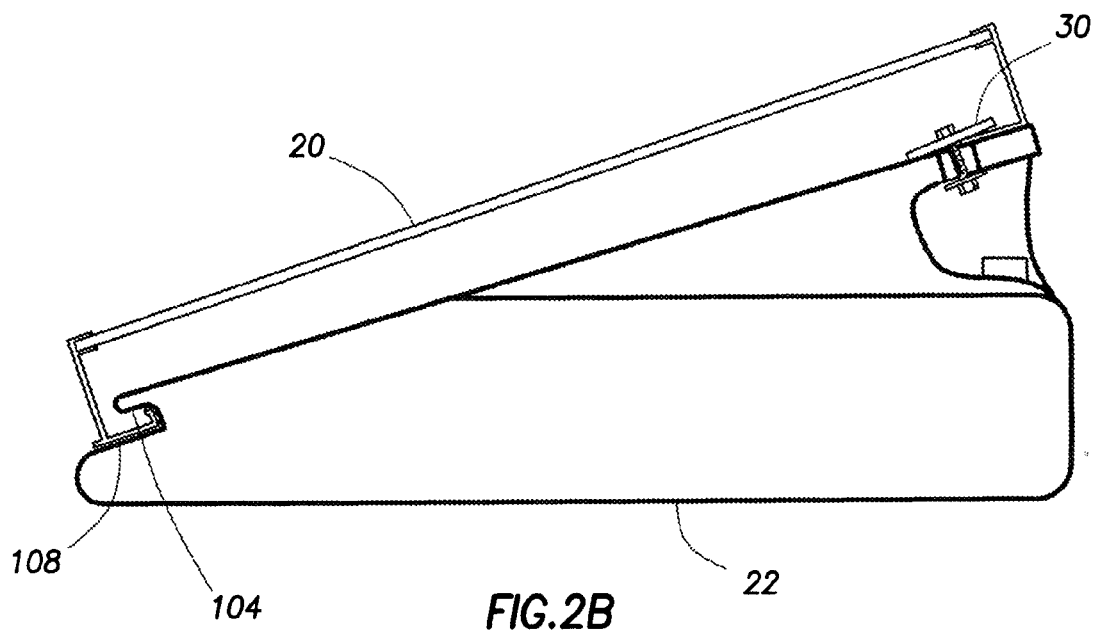
FIG. 2B depicts another embodiment of the vessel of the present disclosure.
Figure 2C:
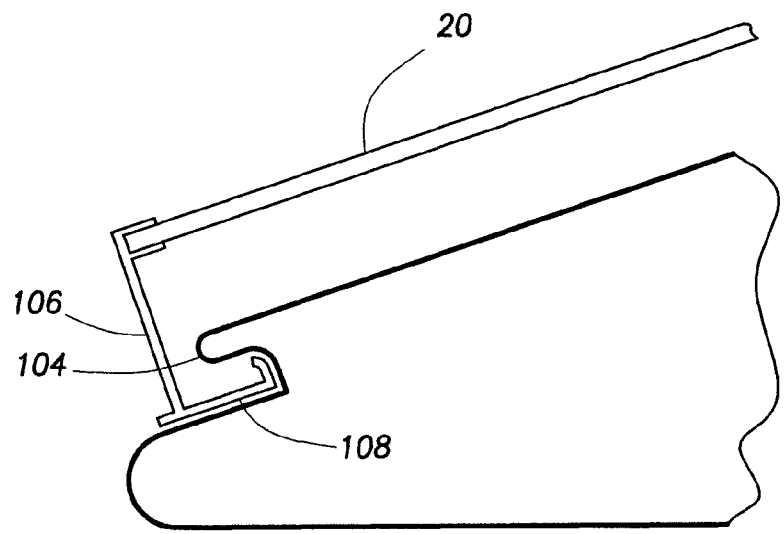
FIG. 2C illustrates a truncated view of the embodiment of FIG. 2B.

In an alternate embodiment shown in FIGS. 2B and 2C, renewable energy panels 20 are attached to vessels 22 through the use of clip mechanism 30 and lower lip 104. In this embodiment, vessels 22 include lower lip 104. As shown in FIG. 2C, lower lip 104 of vessel 22 is designed to engage protrusion 108 of renewable energy panel frame 106 by sliding protrusion 108 between lower lip 104 of vessel 22 and main body 110 of vessel 22. In this way, renewable energy panel 20 may be held against top surface 40 of vessel 22.

In the embodiment shown in FIG. 2, vessel 22 has a substantially flat bottom surface 60. Bottom surface 60 may be configured as desired depending on the surface on which bottom surface rests. For instance, for a flat roof installation, it may be desirable to incline bottom surface 60 for an optimal installation. Further, in the embodiment shown in FIG. 2, generally triangular first panel 62 extends upwardly from a left side 64 of the bottom surface 60 and a generally triangular second panel 66 extends upwardly from a right side 68 of the bottom surface 60. A rear panel 70 extends from the rear side 72 of the bottom surface 60 and connects the panels 62, 66. Panels 62 and 66 may be of other configurations, depending on the shape of vessel 22, including, for instance prisms, squares, rectangles, and other parallelograms. For example, vessel 22 can be in the form of a prism as illustrated in FIG. 2.

Figure 9:
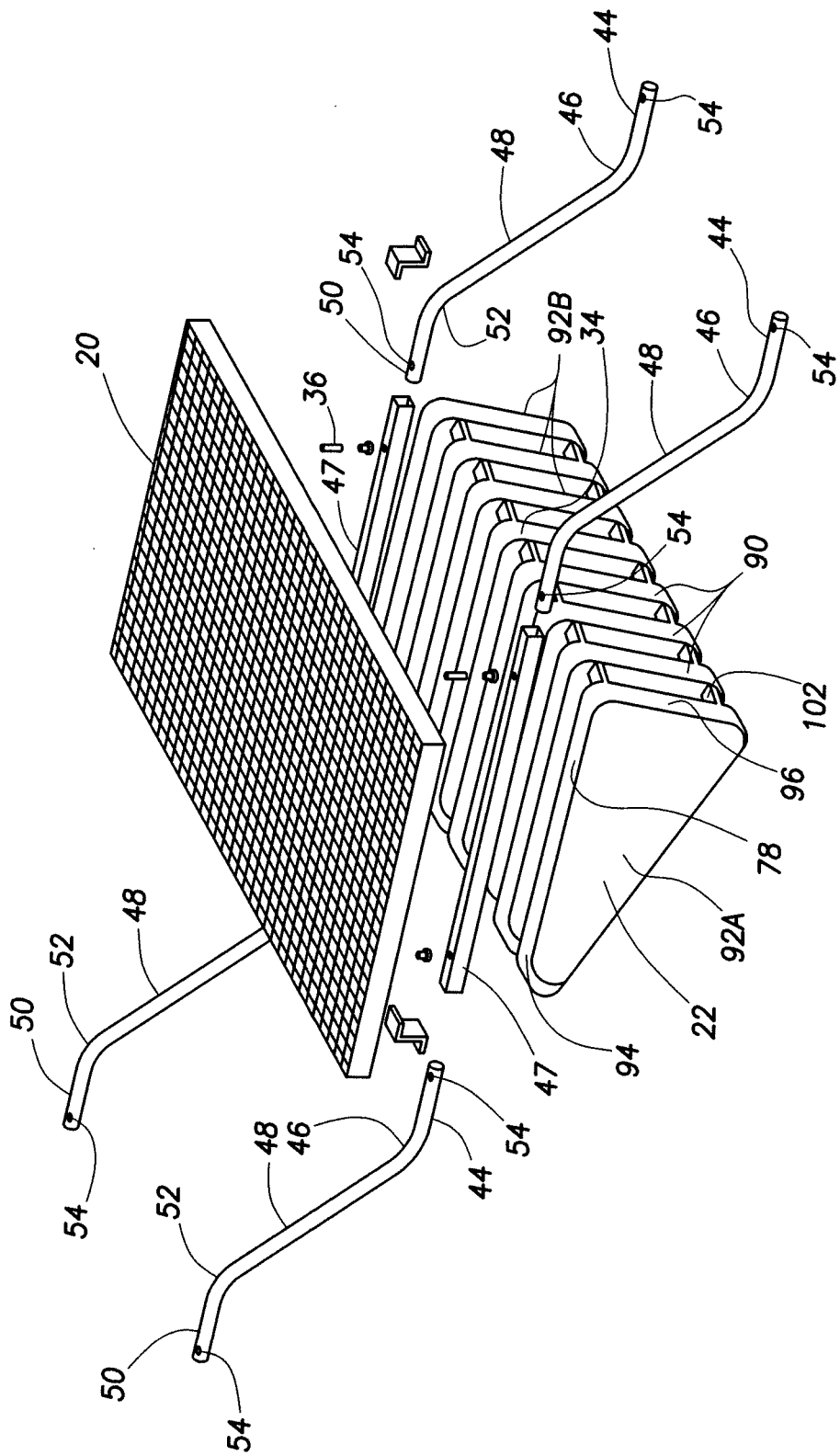
FIG. 9 illustrates an exploded isometric view of another embodiment of the vessel of the present disclosure.

Vessel 22 may be equipped with ribs 34, as shown in FIGS. 2 and 9. Ribs 34 are designed to increase the structural integrity of vessel 22. In the alternate embodiment shown in FIG. 9, additional ribs 34 are depicted, allowing for an increase in structural integrity beyond the embodiment shown in FIG. 2. As those of ordinary skill in the art with the benefit of this disclosure will appreciate, an increase in the number of ribs 34 typically corresponds with an increase in the amount of material used to form vessel 22 and increases the weight of vessel 22.

In an alternative embodiment of vessel 22 depicted in FIGS. 3, 4, 7, and 8, U-shaped front panel 74 extends upwardly around to form a horse-shoe shaped void 76 in the vessel 22. A top panel 78 is disposed on the vessel 22 to close the void 76. In one alternative embodiment shown in FIG. 4, the top panel 78 includes U-shaped profile 79. The U-shape profile 79 provides for efficient stacking/nesting of several vessels 22 to optimize storage and/or transportation. The top panel may be inclined relative to the bottom surface 60 due to the inclination of the triangular panels 62, 66.

In the non-limiting embodiment shown in FIG. 2, fill port 90 is disposed on the top panel 78 near the rear panel 70. Fill port 90 may be disposed as required on any part of vessel 22. Alternatively, in certain embodiments, vessel 22 may be provided pre-filled and fill port 90 may be eliminated. Where present and it is desirable to use a liquid as ballast, fill port cover 92 is provided to close fill port 90. Vessel 22 may contain one or more fill ports 90. In alternate embodiments, such as when the ballast used is sand or gravel, vessel 22 may be formed so as to allow access to the interior of vessel 22 during filling. An exemplary embodiment that allows such access to the interior of vessel 22 is vessel 22 with removable sections.

Empty vessel 22 can be easily transported to and installed on a roof top. In some embodiments, the vessel 22 is made of a high density polyethylene (HDPE) material to ensure that the vessel 22 has a relatively light weight that can be conveniently and easily transported to and installed on a rooftop. Those of ordinary skill in the art will appreciate that other suitable materials may be utilized for construction of the vessel 22 such as other lightweight formable plastics, two-part, non-expanding urethane, fiberglass, or sheet metal. When vessel 22 is made from a lightweight formable plastic, it may be formed by traditional plastic forming processes including injection molding, blow molding, and vacuum molding.

To ensure that vessel 22 is properly anchored on a roof top, a liquid, for example, water, which is readily and cheaply available may be used to fill the vessel 22. Other materials such as sand or gravel may be used to fill the vessel 22. By adjusting the amount of ballast in each vessel 22, the weight of vessel 22 may be adjusted. This allows for vessel 22 to be used for different wind loads. It may be desirable in certain embodiments to limit the ballast in vessel 22 to allow for an air space above the ballast, particularly when the ballast is water. Such an air space may allow for freeze expansion.

In certain embodiments, a gauge, such as a color coded gauge (not shown) may be included on vessel 22 to indicate the level of ballast within vessel 22. In other embodiments, a flow meter may be used to control the amount of ballast added to vessel 22.

Figure 3:
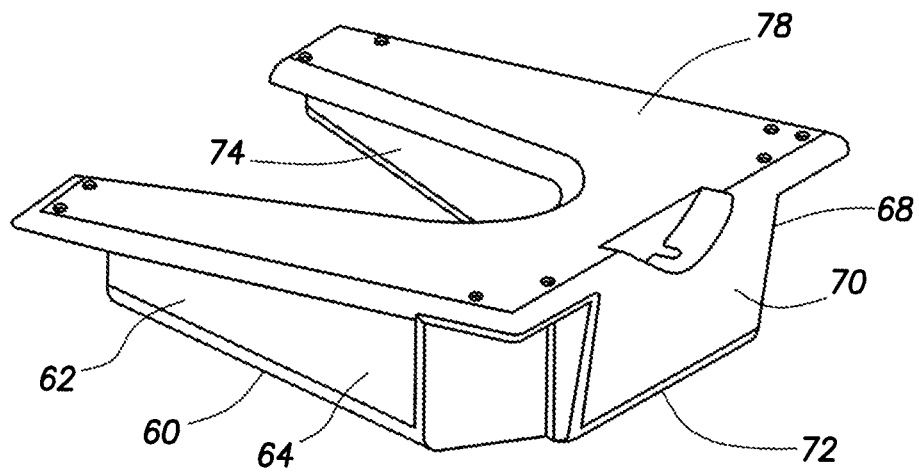
FIG. 3 is an isometric view of an embodiment of a vessel of the attachment apparatus of FIG. 1.
Figure 4:
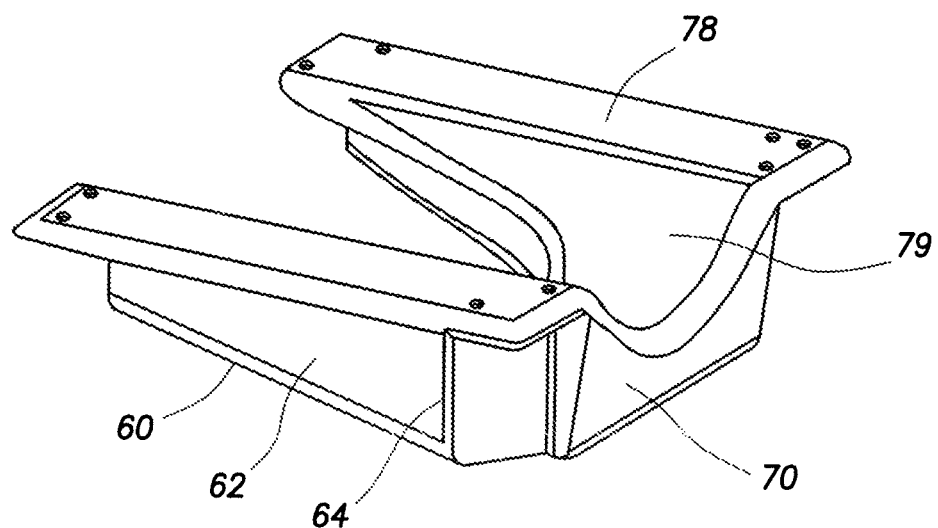
FIG. 4 is an isometric view of another embodiment of the vessel of FIG. 3.
Figure 5:
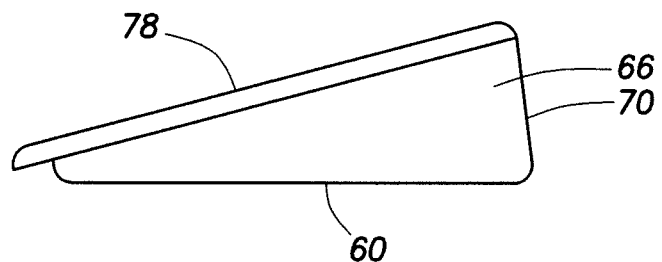
FIG. 5 is a left side elevation of the vessel of FIG. 4.
Figure 6:
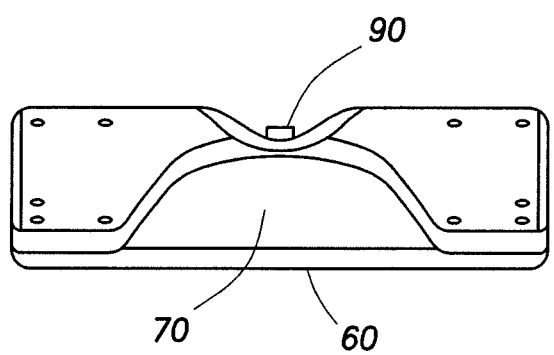
FIG. 6 is a right side elevation of the vessel of FIG. 4.
Figure 7:
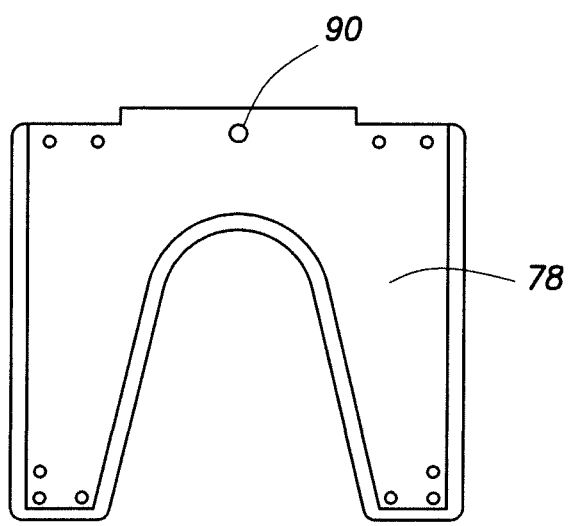
FIG. 7 is a plan view of the vessel of FIG. 4.

The non-limiting horseshoe shape of the vessel 22 and the void 76 shown in FIG. 3 also ensures that a lesser amount of material is required for the manufacture of the vessels 22 than would be necessary for a rectilinear shape while optimizing the internal space of the void 76.

The inclination provided by the triangular side panels 62, 66 as shown in FIG. 3 ensures that the photovoltaic panel 20 installed on the vessel 22 is tilted and may allow a more optimum solar exposure, thereby increasing the solar energy captured by renewable energy panel 20. Typically, such inclination is determined by the latitude placement of vessels 20, with higher latitudes requiring higher inclinations for proper solar exposure. Typically, the inclination angle of triangular side panels 62 and 66 is between 10° and 25°, although inclination angles of less than 10° and more than 25° are possible. As those of ordinary skill in the art with the benefit of this disclosure will appreciate, angles of greater than 25° may result in shadowing that may interfere with nearby renewable energy panels 20.

Still further, it will be appreciated that the horseshoe shape defined by the vessel 22 is optimized for human ergonomics because the vessel 22 can easily be carried over a human shoulder. In addition, the horseshoe shape may allow for efficient packing, storing, and shipping as pairs of vessels 22 may be able to nest, such that the legs of the horseshoe shape are interconnected. In addition, the horseshoe shaped vessels 22 may be stacked atop the interconnected rows of vessels 22 such that the inclined surface is flipped and thick sections are nested atop thin sections of vessels 22. Other shapes of vessel 22 and void 76 are possible, include V shapes and a squared-U shape.

In one embodiment, vessel 22 may include a plurality of triangular vessels sections 90 (FIG. 9). Each vessel section 90 includes two triangular side panels 92A, 92B, top panel 94, rear panel 96 and bottom panel (not shown) that together define void 100. Collapsible flange 102 extends from at least one of side panels 92A, 92B. Flange 102 may be attached to side panel 92 of another vessel 90.

Renewable energy panel 10 may be formed by attaching a plurality of renewable energy panels 20 to a plurality of vessels 22. Prior to inserting screw 36 in holes 38, opening 54 of second flanges 50 of a first set of mounting cross arms 24 are aligned with holes 38 near rear panel 70 and opening 54 of first flanges 44 of a second set of mounting cross arms 24 are aligned with holes 38 near front panel 74. It will be appreciated by one of ordinary skill in the art that first flanges 44 of the first set of mounting cross arms 24 are thereby available to be attached to first adjacent vessel 22. Similarly, second flanges 50 of the second set of mounting arms are available to be attached to second adjacent vessel 22. In certain embodiments of the present invention, renewable energy panels 20 may we wired together and subsequently wired to an electrical grid.

In certain embodiments, where it may not be desirable to move renewable energy panel 10, vessel 22 may be affixed to the structure on which it is placed, such as a roof or the ground. In these circumstances, suitable methods of affixing vessel 22 may be provided, such as adhesives or mechanical mounting devices.

Those of ordinary skill in the art will recognize that the above described renewable energy panel array provides an efficient method of installing and anchoring photovoltaic panels on a roof top.

What is claimed is:

1. A renewable energy panel system comprising:
   a renewable energy panel, the renewable energy panel having a frame;
   a first closed substantially hollow vessel comprising a bottom panel and a top panel spaced from the bottom panel, the top panel is inclined at an angle relative to the bottom panel, a back panel and a curved front panel spaced from the back panel, a first side panel and a second side panel spaced from the first side panel, the back panel and curved front panel each connected to and between the first and second side panels, each of the top and bottom panels having an opening therein extending from an edge thereof, the curved front panel extending along the opening in the top and bottom panels, wherein each of the back panel, curved front panel and side panels are connected to and between the top and bottom panels providing an enclosed hollow space, and
   the renewable energy panel is mounted directly to the substantially hollow vessel;
   the renewable energy panel is mounted to only one substantially hollow vessel.

2. The system of claim 1, wherein the vessel is comprised of a light weight formable plastic, two-part non-expanding urethane, fiberglass, or sheet metal.

3. The system of claim 2, wherein the light weight formable plastic is high density polyethylene.

4. The system of claim 2, wherein the vessel is comprised of a light weight formable plastic manufactured by an injection molding, blow molding, or vacuum molding process.

5. The system of claim 1 further comprising
   a plurality of additional substantially hollow vessels arranged to form a first row of substantially hollow vessels and a second row of substantially hollow vessels; and
   a mounting cross arm, wherein the mounting cross arm couples the first row of substantially hollow vessels to the second row of substantially hollow vessels.

6. The system of claim 1, wherein the horseshoe shaped vessels is horizontally nestable and vertically stackable with other horseshoe shaped vessels.

7. The system of claim 1 further comprising a fill port.

8. The system of claim 1, wherein the top panel is inclined at an angle of between about 10° and about 25° relative to the bottom panel.

9. The system of claim 1 further comprising ribs.

10. A method of retaining an alternative energy source on a rooftop comprising:
    providing a first closed substantially hollow vessel, the vessel comprising a bottom panel and a top panel spaced from the bottom panel, the top panel is inclined at an angle relative to the bottom panel, a back panel and a curved front panel spaced from the back panel, a first side panel and a second side panel spaced from the first side panel, the back panel and curved front panel each connected to and between the first and second side panels, each of the top and bottom panels having an opening therein extending from an edge thereof, the curved front panel extending along the opening in the top and bottom panels, wherein each of the back panel, curved front panel and side panels are connected to and between the top and bottom panels providing an enclosed hollow space, the first substantially hollow vessel having a fill port;

transporting the substantially hollow vessel to a roof top;

conveying a pre-determined quantity of liquid into the substantially hollow vessel; and mounting a renewable energy panel to the first substantially hollow vessel using screws:

wherein the renewable energy panel is mounted to only one substantially hollow vessel;

providing a plurality of the substantially hollow vessels to form a first row of substantially hollow vessels and a second row of substantially hollow vessels; and coupling the first row of substantially hollow vessels to the second row of substantially hollow vessels using a mounting cross arm.

11. The method of claim 10, wherein the step of conveying a pre-determined quantity of liquid further comprises measuring the liquid with a flow meter.

12. An apparatus for mounting a renewable energy panel comprising:

a closed substantially hollow vessel, the substantially hollow vessel comprising a top panel and a bottom panel spaced from the top panel, the top panel is inclined at an angle relative to the bottom panel, a back panel and a curved front panel spaced from the back panel, a first side panel and a second side panel spaced from the first side panel, the back panel and curved front panel each connected to and between the first and second side panels, each of the top and bottom panels having an opening therein extending from an edge thereof, the curved front panel extending along the opening in the top and bottom panels, wherein each of the back panel, curved front panel and side panels are connected to and between the top and bottom panels providing an enclosed hollow space, and wherein the top panel of the substantially hollow vessel is adapted to receive the renewable energy panel; and a mounting cross arm;

wherein the substantially hollow vessel is adapted to receive only one renewable energy panel;

and wherein the mounting cross-arm is attached to the substantially hollow vessel.

13. The apparatus of claim 12 wherein the first side panel and the second side panel are triangular and wherein the top panel is inclined with respect to the bottom panel.

* * * * *